(12) United States Patent
Jung et al.

(10) Patent No.: US 8,705,453 B2
(45) Date of Patent: Apr. 22, 2014

(54) METHOD AND APPARATUS FOR MEASURING A CHANNEL STATE WHEN RECEIVING SYSTEM INFORMATION ON A NEIGHBORING CELL IN A WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 13/500,905

(22) PCT Filed: Nov. 2, 2010

(86) PCT No.: PCT/KR2010/007666
§ 371 (c)(1),
(2), (4) Date: Apr. 6, 2012

(87) PCT Pub. No.: WO2011/055958
PCT Pub. Date: May 12, 2011

(65) Prior Publication Data
US 2012/0196593 A1    Aug. 2, 2012

Related U.S. Application Data

(60) Provisional application No. 61/257,809, filed on Nov. 3, 2009.

(30) Foreign Application Priority Data

Nov. 1, 2010    (KR) .......................... 10-2010-0107731

(51) Int. Cl.
*H04W 48/16* (2009.01)
*H04L 12/26* (2006.01)

(52) U.S. Cl.
USPC .......................... 370/328; 455/434; 455/67.11

(58) Field of Classification Search
CPC .................. H04W 48/16–48/18; H04W 48/20
USPC ................ 370/328–329; 455/434, 423, 67.11
See application file for complete search history.

(56) References Cited

U.S. PATENT DOCUMENTS

2008/0176564 A1*  7/2008  Eerolainen ................... 455/436
2010/0208707 A1*  8/2010  Hamabe et al. ............... 370/332
2011/0310782 A1* 12/2011  Kim et al. ..................... 370/311

FOREIGN PATENT DOCUMENTS

KR    10-2008-0061558    7/2008
KR    10-2009-0086982    8/2009
KR    10-2009-0095559    9/2009

*Primary Examiner* — Marcos Torres
*Assistant Examiner* — Emem Stephen
(74) *Attorney, Agent, or Firm* — Lee, Hong, Degerman, Kang & Waimey

(57) ABSTRACT

The present invention relates to a method for receiving system information on a neighboring cell by means of a terminal in a wireless communication system, the method comprising the steps of receiving a system information read command for a neighboring cell from a serving cell over a certain period of time; ending communication with the serving cell, and reading system information from the adjacent cell; and relaying the system information to the serving cell after the certain period of time elapses, wherein a reference signal from the adjacent cell is received over the certain period of time to measure a channel state value. If the channel state value is reduced to a preset value or less, a further step may comprise ending the reading of the system information.

6 Claims, 11 Drawing Sheets

(a) control-plane protocol stack (b) user-plane protocol stack

METHOD AND APPARATUS FOR MEASURING A CHANNEL STATE WHEN RECEIVING SYSTEM INFORMATION ON A NEIGHBORING CELL IN A WIRELESS COMMUNICATION SYSTEM

CROSS-REFERENCE TO RELATED APPLICATIONS

This application is the National Stage filing under 35 U.S.C. 371 of International Application No. PCT/KR2010/007666, filed on Nov. 2, 2010, which claims the benefit of earlier filing date and right of priority to Korean Application No. 10-2010-0107731, filed on Nov. 1, 2010, and also claims the benefit of U.S. Provisional Application Ser. No. 61/257,809, filed on Nov. 3, 2009, the contents of which are all incorporated by reference herein in their entirety.

TECHNICAL FIELD

The present invention relates to a wireless communication system, and more particularly, to a method and apparatus for measuring a channel state when receiving system information on a neighboring cell in a wireless communication system.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system.

Referring to FIG. 1, the E-UMTS includes a User Equipment (UE), base stations (eNode B and eNB), and an Access Gateway (AG) which is located at an end of a network (E-UTRAN) and connected to an external network. Generally, the base stations may simultaneously transmit multiple data streams for a broadcast service, a multicast service and/or a unicast service. An interface for transmitting user traffic or control traffic may be used between cells.

The access gateway (AG) may be divided into a portion for processing user traffic and a portion for processing control traffic. At this time, a new interface may be used for communication between the access gateway for processing user traffic and the access gateway for processing control traffic. Also, the access gateway manages mobility of a user equipment on a Tracking Area (TA) basis, wherein one TA includes a plurality of cells. If the user equipment moves from a specific TA to another TA, it notifies the access gateway that the TA where the user equipment is located has been changed.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations.

A Core Network (CN) may include the access gateway (AG) and a network node or the like for user registration of the user equipment. An interface for identifying the E-UTRAN from the core network may be used.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). In this specification, this technology will be referred to as "LTE-Advanced" or "LTE-A." One of important differences between the LTE system and the LTE-A system is difference in system bandwidth. The LTE-A system aims to support a wideband of maximum 100 MHz.

DISCLOSURE

Technical Problem

An object of the present invention devised to solve the conventional problem is to provide a method and apparatus for measuring a channel state when receiving system information on a neighboring cell in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for receiving system information on a neighboring cell by means of a user equipment in a wireless communication system comprises the steps of receiving a system information reading command of a neighboring cell from a serving cell for a certain time period; suspending communication with the serving cell, and reading system information from the neighboring cell; and reporting the system information to the serving cell after the certain time period elapses, wherein a reference signal from the neighboring cell is received for the certain time period to measure a channel status value. In this case, the method further comprises the step of suspending reading of the system information if the channel status value is reduced to a preset value or less.

More preferably, the method further comprises the step of transferring a system information reading suspension indicator to the serving cell if the reading of the system information is suspended. In this case, the method further comprises the step of resuming communication with the serving cell if the reading of the system information is suspended.

To solve the aforementioned technical problems, according to another aspect of the present invention, a user equipment in a wireless communication system comprises a wireless communication module for transmitting and receiving a signal to and from a serving cell and a neighboring cell; and a processor for processing the signal, wherein the processor, if a system information reading command of the neighboring cell is received from the serving cell for a certain time period, suspends communication with the serving cell, reads system information from the neighboring cell for the certain time period, and reports the system information to the serving cell, and the processor receives a reference signal from the neighboring cell for the certain time period to measure a channel status value. Preferably, the processor suspends reading of the system information if the channel status value is reduced to a preset value or less.

More preferably, the processor transfers a system information reading suspension indicator to the serving cell if the reading of the system information is suspended. At this time, the processor resumes communication with the serving cell.

Meanwhile, the system information reading suspension indicator is transmitted to the serving cell together with the channel status value.

Advantageous Effects

According to the embodiments of the present invention, a user equipment quickly suspends reception of system information if it is difficult to receive the system information due to quality degradation of a target cell, whereby service unavailable time between the user equipment and the serving cell may be prevented from being increased. Also, the user equipment may report reception suspension of the system information on the neighboring cell and the degraded channel quality value of the neighboring cell to the serving cell, whereby the serving cell may not command the user equipment to perform handover to the corresponding neighboring cell.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following description will be made based on, but not limited to, some terminologies. And, other random terminologies may be designated to refer to the same meaning. Wherever possible, the same reference numbers will be used throughout the drawings to refer to the same or like parts.

Also, terminologies described in this specification and claims should not be interpreted as general or dictionary definition and are provided to assist understanding of the present invention within the range that they do not depart from technical spirits of the present invention.

Prior to description of the present invention, an evolved universal mobile telecommunications system (E-UMTS), which is the technical field of the present invention, and its technical features will be described as follows.

Figure 1:
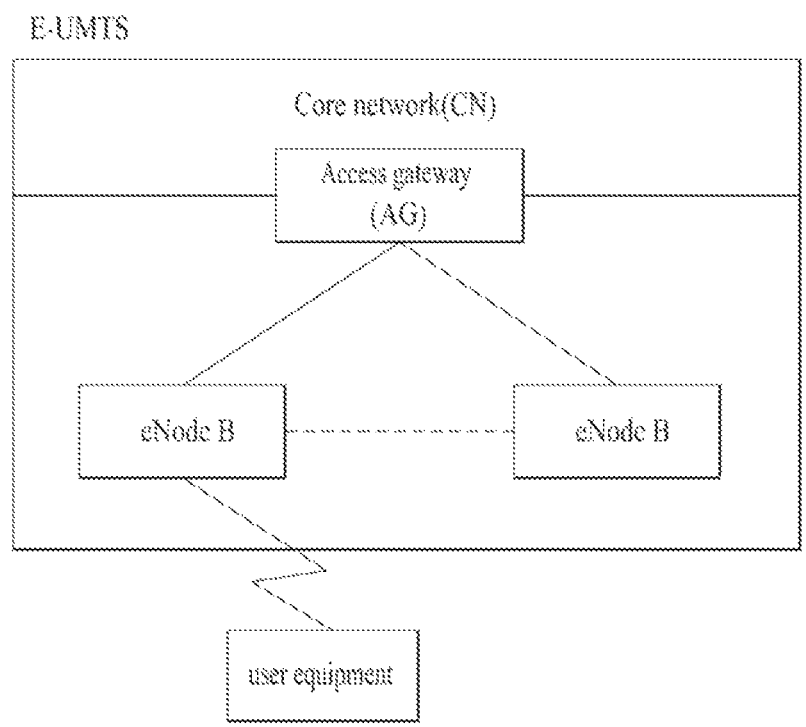
FIG. 1 is a diagram conceptionally illustrating a network structure of an Evolved Universal Mobile Telecommunications System (E-UMTS)
Figure 2:
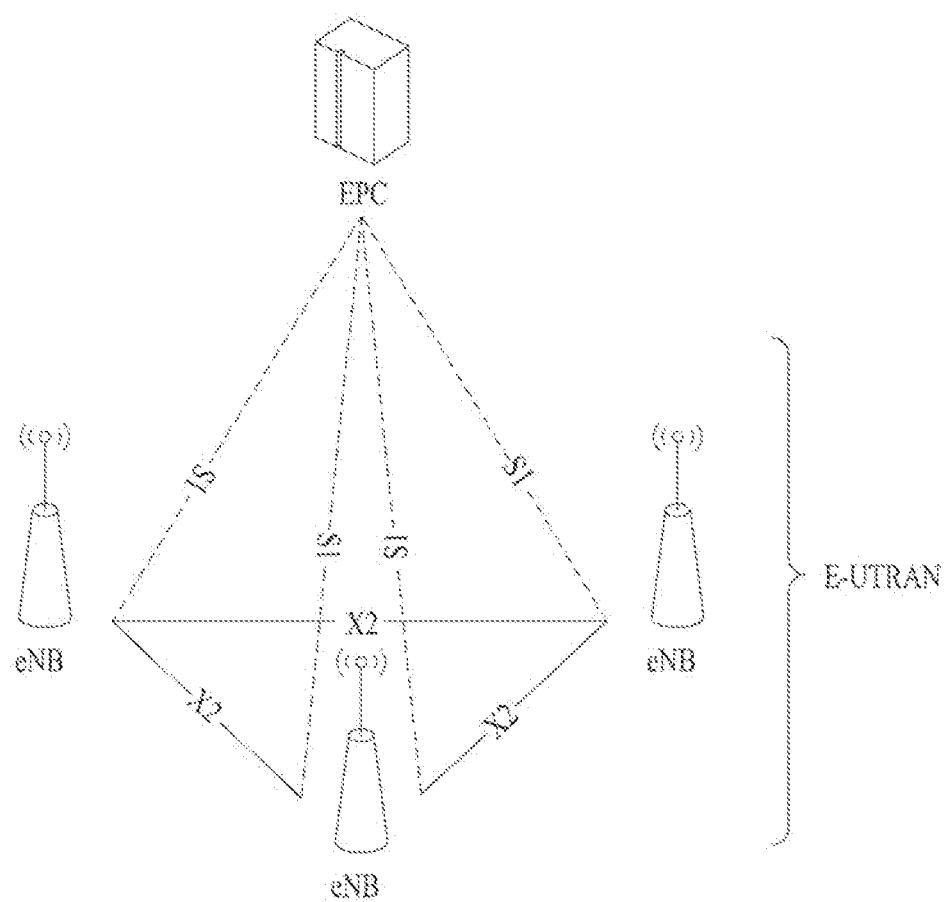
FIG. 2 is a diagram conceptionally illustrating a network structure of an evolved universal terrestrial radio access network (E-UTRAN)

FIG. 2 is a diagram conceptionally illustrating a network structure of an evolved universal terrestrial radio access network (E-UTRAN). In particular, the E-UTRAN system is a system evolving from the conventional UTRAN system. The E-UTRAN includes cells (eNB), wherein the respective cells are connected with each other through an interface X2. Also, each of the cells eNBs is connected with a user equipment through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment, wherein the access information or the ability information is mainly used for mobility management of the user equipment. The S-GW is a gateway having the E-UTRAN as an end point, and the PDN-GW is a gateway having a packet data network (PDN) as an end point.

The user equipment performs a cell selection procedure to receive a service from the cell, and registers itself with a network. Also, if signal strength or signal quality between the user equipment and the cell is deteriorated due to mobility of the user equipment, the user equipment performs a cell reselection procedure to maintain transmission quality of data.

In the 3GPP standard document TS 36.304, two types of cell selection procedures are defined as follows.

First of all, one of the cell selection procedures is an initial cell selection procedure. The initial cell selection procedure is performed when the user equipment does not have advance information on a radio channel. In this case, the user equipment searches for all the radio channels to discover a proper cell, and selects a cell corresponding to a radio channel having the strongest signal quality from the searched radio channels.

The other one of the cell selection procedures is a stored information cell selection procedure. The stored information cell selection procedure is performed when the user equipment previously stores information on a radio channel. In this case, since the user equipment has already information on a radio channel, it may select a cell more quickly than the aforementioned initial cell selection procedure.

Figure 3:
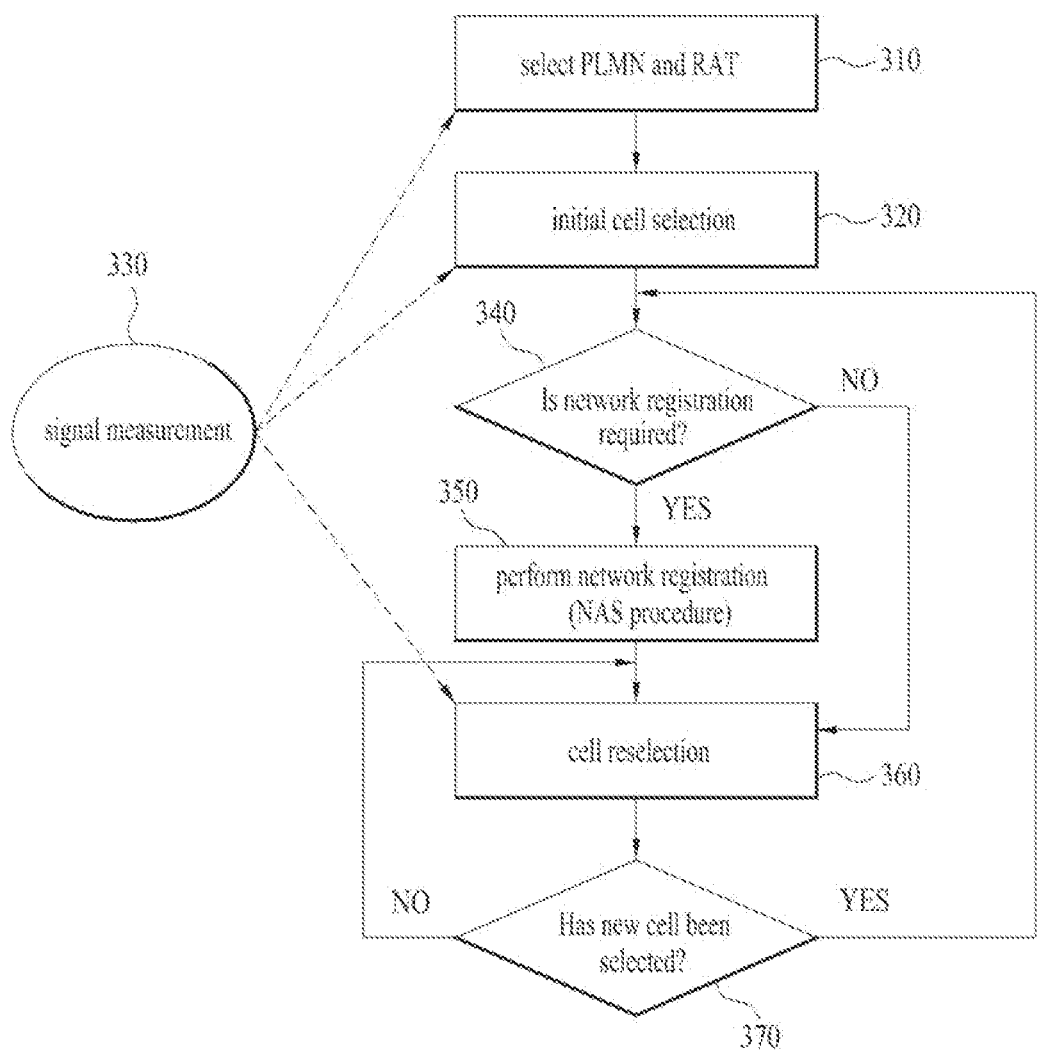
FIG. 3 is a flow chart illustrating an operation of a user equipment when the user equipment is powered on in a long term evolution (LTE) system.

FIG. 3 is a flow chart illustrating an operation of a user equipment when the user equipment is powered on in a long term evolution (LTE) system.

Referring to FIG. 3, the user equipment selects a public land mobile network (PLMN) and radio access technology (RAT) for communication automatically or passively when it is powered on at step 310, wherein the PLMN is the network desired by the user equipment to receive a service. The PLMN and RAT information may be selected by a user of the user equipment. Also, information stored in a universal subscriber identity module (USIM) may be used as the PLMN and RAT information. In this case, the user equipment measures a signal transmitted from the cell periodically or non-periodically, that is, reference signal or pilot signal at step S330, and obtains cell quality information by using features of a physical signal related to signal strength or a signal to noise/interference ratio.

Afterwards, the user equipment performs a cell selection procedure for selecting a cell having the greatest value from cells having the measured cell quality information greater than a reference value at step 320. The reference value means a value defined in the system to assure quality of a physical signal in data transmission and reception. Accordingly, the reference value may be varied depending on the applied RAT and may depend on the following Equation 1 in the LTE system.

Then, the user equipment receives system information periodically transmitted from the cell, and registers its information (for example, international mobile subscriber identity (IMSI)) with a network to receive a service from the network at step 350. The user equipment does not register its information with the network whenever selecting a cell but registers its information with the network when information (for example, tracking area identify (TAI) of the network, which is received from the SI, is different from information of the network known by itself, like steps 340 and 370.

Also, if signal strength or signal quality measured from a serving cell is lower than that measured from a neighboring cell, the user equipment reselects one of other cells that provide signal feature better than that of a cell accessed by the user equipment at step 360. This procedure will be referred to as a cell reselection procedure classified from the cell selection procedure of the step 320.

Meanwhile, in the 3GPP standard document TS 36.304, services provided from the E-UTRAN to the user equipment are classified into three types as follows.

TABLE 1

| | |
|---|---|
| Limited service | Provides Emergency call and ETWS (Earthquake and Tsunami Warning System). |
| Normal service | Provides service of public use. |
| Operator service | Provides service for communication network provider. |

Also, in the 3GPP standard document TS 36.304, cell types are classified as follows in respective of service types provided from the cell to the user equipment.

TABLE 2

| | |
|---|---|
| Acceptable cell | Cell where user equipment may receive limited service |
| Suitable cell | Cell where user equipment may receive normal service. |
| Barred cell | Cell designated as barred cell in system information. |
| Reserved cell | Cell designated as reserved cell in system information. |

In this case, the acceptable cell is the cell that is not barred and satisfies a cell selection basis of the user equipment, and receives only a limited service such as emergency call and ETWS.

Also, the suitable cell satisfies the conditions of the acceptable cell, and at the same time satisfies additional conditions. The additional conditions are that the corresponding user equipment should belong to the PLMN and a TA update procedure of the user equipment should not be barred. If the corresponding cell is a closed subscriber group (CSG) cell, the suitable cell should be a cell that may be accessed by the user equipment as a CSG member.

For reference, in the 3GPP standard document TS 25.304, services and cell types provided from the UTRAN to the user equipment are defined. In the 3GPP standard document TS 43.022, services and cell types provided from a global system for mobile communication (GSM) to the user equipment are defined. In particular, limited services provided by the UTRAN and the GSM support emergency call only except for the ETWS.

The following Equation 1 represents a cell selection basis in the LTE system disclosed in the 3GPP standard document TS 36.304.

$$Srxlev = Q_{rxlevmeas} - (Q_{rxlevmin} + Q_{rxlevminoffset}) - Pcompensation > 0 \quad \text{[Equation 1]}$$

Parameters used in the Equation 1 are as follows.

TABLE 3

| | |
|---|---|
| $Q_{rxlevmeas}$ | Receiving level of measured cell (RSRP). |
| $Q_{rxlevmin}$ | Minimum receiving level (dBm) required in cell |
| $Q_{rxlevminoffset}$ | Offset for $Q_{rxlevmin}$ |
| Pcompensation | $\max(P_{EMAX} - P_{UMAX}, 0)$ (dB) |
| $P_{EMAX}$ | Maximum transmission power (dBm) of user equipment to corresponding cell |
| $P_{UMAX}$ | Maximum transmission power (dBm) of radio frequency module of user equipment |

The user equipment receives the parameters of Table 3 through system information (SI), and performs the cell selection procedure by using the cell selection basis of the Equation 1.

In the mean time, the aforementioned system information includes essential information that should be known by the user equipment to access a cell. Accordingly, the user equipment should have the latest system information before accessing the cell. Also, since the system information is the information that should be known by all the user equipments within one cell, the cell transmits the system information periodically.

Such system information is divided into a master information block (MIB), a scheduling block (SB), and a system information block (SIB). The MIB allows the user equipment to know physical configuration of the corresponding cell, for example, bandwidth information. The SIB is the aggregation of related system information. For example, some SIB includes only information of peripheral cells, and another SIB includes only information of an uplink radio channel used by the user equipment. The SB indicates transmission information of the SIBs, for example, transmission period.

In the mean time, after the user equipment selects a cell through the cell selection procedure, signal strength or signal quality between the user equipment and the cell may be changed due to mobility of the user equipment or change of a radio environment. If quality of the selected cell is deteriorated, the user equipment may select another cell that provides better quality. If the user equipment reselects such a cell, it selects a cell that provides signal quality better than that of the currently selected cell. This will be referred to as a cell reselection procedure.

The cell reselection procedure is basically intended to select a cell that provides the best quality to the user equipment, in view of quality of a radio signal. In addition to quality of the radio signal, the network may determine priority per frequency and notify the user equipment of the determined priority. The user equipment that has received the priority first considers the priority prior to quality basis of the radio signal for the cell reselection procedure. The cell reselection procedure may be classified as illustrated in Table 4 below in accordance with the RAT and frequency features of the cell.

TABLE 4

| | |
|---|---|
| Intra-frequency cell reselection | Reselection of cell having the same RAT and the same center-frequency as those of serving cell |
| Inter-frequency cell reselection | Reselection of cell having RAT and center-frequency different from those of serving cell |
| Inter-RAT cell reselection | Reselection of cell having RAT different from that currently used by serving cell |

Cell reselection is performed on the basis of the cell reselection basis. The cell reselection basis has the following features in respect of measurement of a serving cell and a neighboring cell.

First of all, the intra-frequency cell reselection is basically based on ranking. In this case, ranking means that index values for cell reselection assessment are defined and index values of cells are ranked in the order of size using the defined index values. In this case, the cell having the best index will be referred to as the best ranked cell. Also, the cell index value is obtained by applying frequency offset or cell offset, if necessary, on the basis of the value measured by the user equipment for the corresponding cell.

Second, the inter-frequency cell reselection is based on frequency priority provided by the network. The user equipment tries to camp on the frequency having the highest frequency priority. The network may provide frequency priority to be commonly applied to user equipments within a cell through broadcast signaling, or may provide priority per frequency to each user equipment through user equipment specific signaling. Also, for the inter-frequency cell reselection, the network may provide parameters used for cell reselection to the user equipment per frequency.

Third, for the intra-frequency or inter-frequency cell reselection, the network may provide a neighboring cell list (NCL) used for cell reselection to the user equipment. The neighboring cell list includes a cell specific parameter used for cell reselection.

Finally, for the intra-frequency or inter-frequency cell reselection, the network may provide a cell reselection black list used for cell reselection to the user equipment. The user equipment does not perform cell reselection for the cell included in the black list.

Subsequently, ranking performed for the cell reselection assessment procedure will be described. Index values of cells, which are used to rank the cells, are defined as expressed by the following Equation 2, and parameters used in the Equation 2 are illustrated in Table 5 below. In this case, a subscript 's' means a serving cell, and a subscript 'n' means a neighboring cell.

$$R_s = Q_{meas,s} + Q_{Hyst}$$

$$R_n = Q_{meas,n} - Q\text{offset} \qquad \text{[Equation 2]}$$

TABLE 5

| | |
|---|---|
| $Q_{meas}$ | Quality value measured by user equipment for corresponding cell |
| Qoffset | Intra-frequency: If user equipment receives offset value, Qoffset$_{s, n}$ between serving cell and specific neighboring cell, Qffoset = Qoffset$_{s, n}$ If user equipment does not receive offset value, Qoffset$_{s, n}$ for corresponding cell, Qoffset = 0 is applied. Inter-frequency: If user equipment receives offset, Qoffset s, n for corresponding cell, Qoffset = Qoffset$_{s, n}$ + Qfrequency If user equipment does not receive offset value, Qoffset$_{s, n}$ for corresponding cell, Qoffset = Qfrequency |
| $Q_{Hyst}$ | If cell reselection index value (Rs) of serving cell and cell reselection index value (Rn) of neighboring cell are changed similarly, ranking is changed frequently, whereby user equipment may reselect two cells alternately. This parameter is to prevent two cells from being alternately reselected by user equipment. |

The user equipment measures $R_s$ of the serving cell and $R_n$ of the neighboring cells in accordance with the Equation 2, regards the cell having the greatest R value as the best rank cell and reselects the corresponding cell. This will be referred to as R-criterion. According to definition for the R, it is noted that cell quality acts as the most important criterion in cell reselection based on the R-criterion. Cell reselection is performed only if comparison should be maintained for a time period $T_{reselection}$ during comparison of the R values. If the reselected cell is not the suitable cell, the user equipment excludes the corresponding frequency or the corresponding cell from targets for cell reselection.

Subsequently, speed scaling that affects cell reselection in accordance with a user equipment speed state will be described. If the user equipment passes cells at high speed, problems occur in that cell reselection is not performed exactly, and the user equipment may not camp on a specific cell. These problems occur due to the $T_{reselection}$ time for preventing cell reselection from occurring unnecessarily. A radio state of a neighboring cell, which is measured by the user equipment for the $Tr_{eselection}$ time, should be higher than a specific value. However, a problem occurs in that the cell reselection condition may not be satisfied by the existing $T_{reselection}$ if moving speed of the user equipment is fast. If the moving speed state of the user equipment is changed, speed scaling is intended to reduce $T_{reselection}$, whereby cell reselection is performed even at the fast moving speed. The speed state change of the user equipment is determined in such a manner that the number of times for cell reselection for a certain time period is compared with a specific value.

Figure 4:
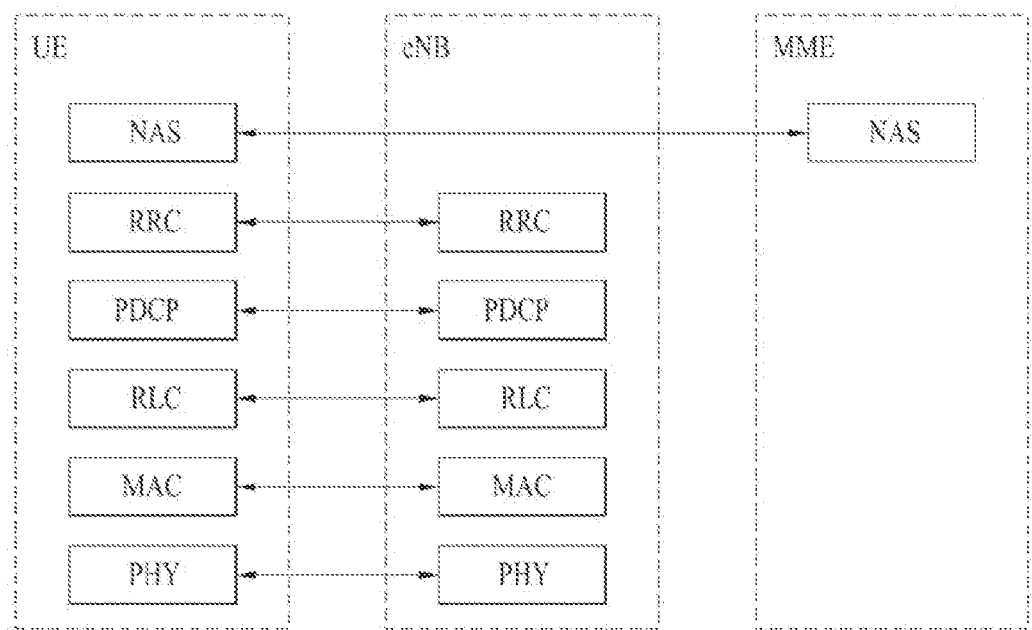
FIG. 4 is a diagram illustrating structures of a control plane and a user plane of a radio interface protocol between a user equipment and E-UTRAN based on the 3GPP radio access network standard.
Figure 4:
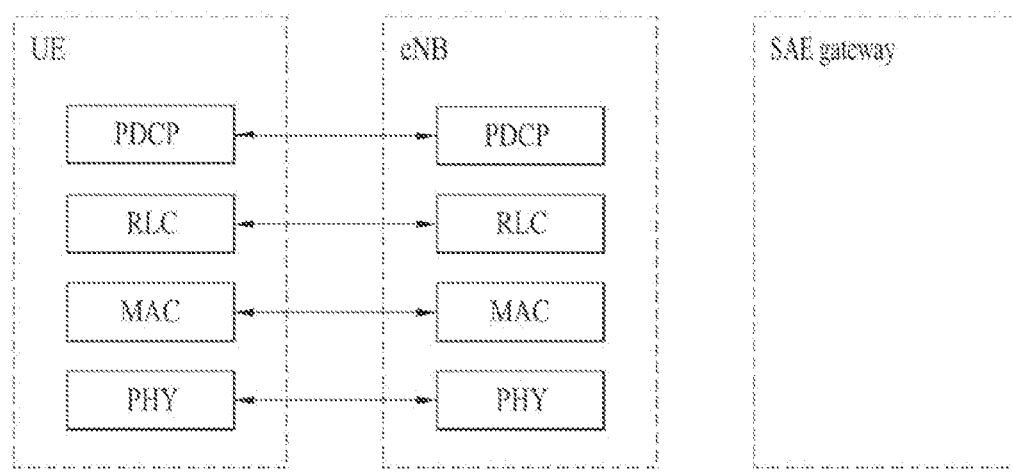

FIG. 4 is a diagram illustrating structures of a control plane and a user plane (U-Plane, User-Plane) of a radio interface protocol between a user equipment and E-UTRAN based on the 3GPP radio access network standard. In particular, the radio interface protocol horizontally includes a physical layer, a data link layer, and a network layer, and vertically includes a user plane for data information transfer and a control plane for control signal transfer.

Also, the protocol layers in FIG. 4 may be classified into L1 (first layer), L2 (second layer), and L3 (third layer) based on three lower layers of the open system interconnection (OSI) standard model widely known in the communications systems.

The control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

A physical layer corresponding to the first layer provides an information transfer service to an upper layer using a physical channel. The physical layer is connected to a medium access control (MAC) layer above the physical layer through a transport channel. Data are transferred between the MAC layer and the physical layer through the transport channel. Also, data are transferred between physical layers of a transmitting side and a receiving side through a physical channel. The physical channel is modulated in accordance with an orthogonal frequency division multiplexing (OFDM) scheme, and uses time and frequency as radio resources.

A MAC layer of the second layer provides a service to a radio link control (RLC) layer corresponding to its upper layer through a logical channel. The RLC layer of the second layer supports reliable data transmission. A function of the RLC layer may be implemented by a functional block within the MAC layer. In this case, the RLC layer may not exist. In order to effectively transmit IP packets such as IPv4 or IPv6 within a radio interface having a narrow bandwidth, a PDCP (packet data convergence protocol) layer of the second layer performs header compression to reduce unnecessary control information.

A radio resource control (RRC) layer located on the lowest part of the third layer is defined in the control plane only and is associated with configuration, re-configuration and release of radio bearers (RBs) to be in charge of controlling the logical, transport and physical channels. The radio bearer means a service provided by the second layer for data transfer between the user equipment and the E-UTRAN. To this end, the RRC layer allows the user equipment and the network to exchange RRC message with each other.

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC connected state, on the basis of cell unit, it may effectively control the user equipment. On the other hand, the E-UTRAN may not identify the user equipment which is in the RRC idle state, on the basis of cell unit. In this case, the user equipment is managed by the core network (CN) on the basis of TA unit which is a local unit greater than the cell unit. In other words, in order that the user equipment which is in the RRC idle state receives a service such as voice or data, the user equipment should be shifted to the RRC connected state.

In particular, when the user initially turns on the power of the user equipment, the user equipment searches for a proper cell and then is maintained in the RRC idle state in the corresponding cell. The user equipment maintained in the RRC idle state performs RRC connection establishment with the RRC layer of the E-UTRAN only if the RRC connection is required, and then is shifted to the RRC connected state. In this case, the case where the RRC connection is required may include a case where uplink data transmission is required due to calling attempt of the user or a case where a response message to a paging message transmitted from the E-UTRAN should be transmitted.

As described above, since the cell selection procedure is performed by the user equipment in a state that the user equipment does not determine a cell maintained in the RRC idle state, it is more important that cell selection is performed quickly if possible. Accordingly, a cell that provides radio signal quality greater than a certain criterion may be selected by the cell selection procedure of the user equipment even though the cell is not the cell that provides the best radio signal quality, that is, even though the cell is the acceptable cell not the suitable cell.

In the mean time, if normal communication cannot be performed due to quality degradation of the radio channel or difference in establishment between the user equipment and the network, the user equipment determines that there is a problem in the current communication link and starts RRC connection reestablishment procedure.

The 3GPP standard document TS 36.331 discloses examples of the case where normal communication cannot be performed, as follows: the case where the user equipment determines that there is a serious problem in downlink communication link quality on the basis of the radio quality measurement result of the physical layer of the user equipment; the case where the user equipment determines that there is a serious problem in uplink transmission due to continuous failure of a random access procedure in the MAC sub layer or continuous failure of uplink data transmission in the RLC sub layer; the case where the user equipment determines that handover has been failed; and the case where a message received by the user equipment does not pass an integrity check.

A non-access stratum (NAS) layer located above the RRC layer in (a) of FIG. 4 performs functions such as session management and mobility management. For mobility management of the user equipment, two types of states, an EPS mobility management registered (EMM-REGISTERED) state and an EMM unregistered (EMM-UNREGISTERED) state are defined in the NAS layer. These two states are applied to the user equipment and the MME. The user equipment is initially in the EMM-unregistered state, and performs a registration procedure with the corresponding network through an initial attach procedure to access the network. If the initial attach procedure is successfully performed, the user equipment and the MME are in the EMM registered state.

Also, in order to manage signaling connection between the user equipment and the EPC, two types of states, an EPS connection management (ECM) idle (ECM_IDLE) state and an ECM connected (ECM_CONNECTED) state are defined in the NAS layer. These two states are applied to the user equipment and the MME. If the user equipment of the ECM idle state is RRC connected with the E-UTRAN, the corresponding user equipment is in the ECM connected state. The MME which is in the ECM idle state is S1 connected with the E-UTRAN, it is in the ECM connected state.

When the user equipment is in the ECM idle state, the E-UTRAN does not have context of the user equipment. Accordingly, the user equipment which is in the ECM idle state performs a user equipment based mobility related procedure such as cell selection or cell reselection without any command from the network. On the other hand, when the user equipment is in the ECM connected state, mobility of the user equipment is managed by the command of the network. If the position of the user equipment is different from that known by the network in the ECM idle state, the user equipment notifies the network of its position through a tracking area (TA) update procedure.

Next, HeNB (or HNB) will be described. A mobile communication service may be provided through a base station owned by a person or a specific provider or group in addition to a mobile communication network provider. This base station will be referred to as home NB (HNB) or home eNB (HeNB). The HeNB is basically intended to provide a specific service to a closed subscriber group (CSG) only. However, the HeNB may provide a service to other users in addition to the CSG in accordance with its operation mode establishment.

Figure 5:
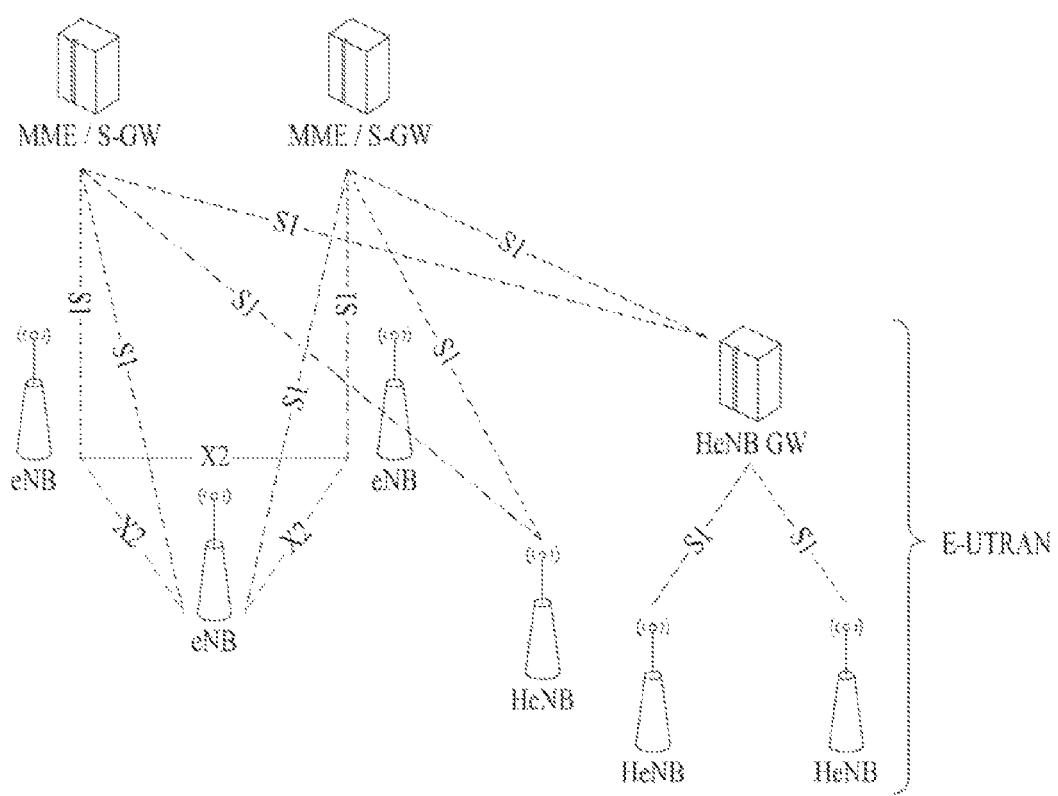
FIG. 5 is a diagram illustrating a configuration of a wireless communication system that includes HeNB.

FIG. 5 is a diagram illustrating a configuration of a wireless communication system that includes HeNB.

Referring to FIG. 5, the E-UTRAN may manage a HeNB gateway (GW) to provide a service to the HeNB. The HeNBs are connected to the EPC through the HeNB GW, or are directly connected to the EPC. The HeNB GW is recognized by the MME as a normal cell, and is also recognized by the HeNB as the MME. Accordingly, the HeNB is connected with the HeNB GW through an interface S1, and the HeNB GW is connected with the EPC through the interface S1. Also, even in the case that the HeNB is directly connected with the EPC, the HeNB is connected with the EPC through the interface S1.

Generally, as compared with the eNB owned by the mobile communication network provider, the HeNB has lower radio transmission output. Accordingly, it is general that a service coverage provided by the HeNB is smaller than a service coverage provided by the eNB. The cell provided by the HeNB is regarded as a femto cell in view of the service coverage as compared with a macro cell provided by the eNB. Meanwhile, when the HeNB provides a service to the CSG only in view of the service, the cell provided by the HeNB will be referred to as a CSG cell.

Each CSG has its unique identification number, and the identification number will be referred to as CSG ID (CSG identity). The user equipment has a list of CSGs to which the user equipment belongs as a member, and the list of CSGs may be changed by request of the user equipment or command of the network. Generally, one HeNB may support one CSG.

The HeNB transfers CSG ID of a CSG through system information, whereby a user equipment corresponding to a member of the corresponding CSG accesses the corresponding cell. In this case, the CSG is supported by the HeNB. When the user equipment discovers the CSG cell, it may identify a CSG supported by the CSG cell by reading out CSG ID included in the system information. The user equipment that has read out the CSG ID regards the corresponding cell as an accessible cell only if it is a member of the corresponding CSG cell.

In the mean time, the HenB does not need to always allow access to the CSG user equipment only. The HeNB may allow access of the user equipment which is not the CSG member, in accordance with its configuration establishment. A user equipment allowed for access may be changed depending on establishment of the operation mode of the HeNB. The operation mode of the HeNB is classified as illustrated in Table 6 below depending on a user equipment that receives a service.

TABLE 6

| | |
|---|---|
| Closed access mode | Mode that provides a service to a specific CSG member only. HeNB provides CSG cell. |
| Open access mode | Mode that provides a service without restriction limited to a specific CSG member, like normal eNB. HeNB provides a normal cell not the CSG cell. |
| Hybrid access mode | Mode that may provide a CSG service to a specific CSG member and provides a service to a non-CSG member like a normal cell. A cell is recognized by a CSG member UE as a CSG cell, and is recognized by a non-CSG member UE as a normal cell. This cell is referred to as a hybrid cell. |

The HeNB notifies the user equipment whether the cell supported by the HeNB is the CSG cell or the normal cell, whereby the user equipment may know whether it may access the corresponding cell. The HeNB managed by a closed access mode broadcasts that it is the CSG cell, through system information. The HeNB managed by an open access mode broadcasts that it is not the CSG cell, through system information.

As described above, the HeNB includes a CSG indicator of 1 bit in the system information, wherein the CSG indicator indicates whether the cell supported by the HeNB is the CSG cell. For example, the CSG cell sets the CSG indicator to TRUE. If the cell supported by the HeNB is not the CSG cell, the CSG cell may set the CSG indicator to FALSE or may use a method for omitting CSG indicator transmission.

Since the user equipment should identify the normal cell provided by the eNB from the CSG cell, the normal eNB may transmit the CSG indicator, whereby the user equipment may know that the cell provided by the eNB is the normal cell. Also, the normal eNB may not transmit the CSG indicator, so as to allow the user equipment to know that the cell type provided by the eNB is the normal cell.

Table 7 illustrates CSG related parameters transmitted from the corresponding cell per cell type. Also, Table 8 illustrates types of user equipments that are allowed for access per cell type.

TABLE 7

| | CSG cell | Normal cell |
|---|---|---|
| CSG indicator | Indicates CSG cell. | Indicates Non-CSG cell or does not transmit CSG indicator. |
| CSG identifier | Transmits supported CSG identifier | Does not transmit CSG identifier. |

TABLE 8

| | CSG cell | Normal cell |
|---|---|---|
| User equipment that does not support CSG | No access | Access allowed |
| Non-CSG member user equipment | No access | Access allowed |
| CSG member user equipment | Access allowed | Access allowed |

Figure 6:
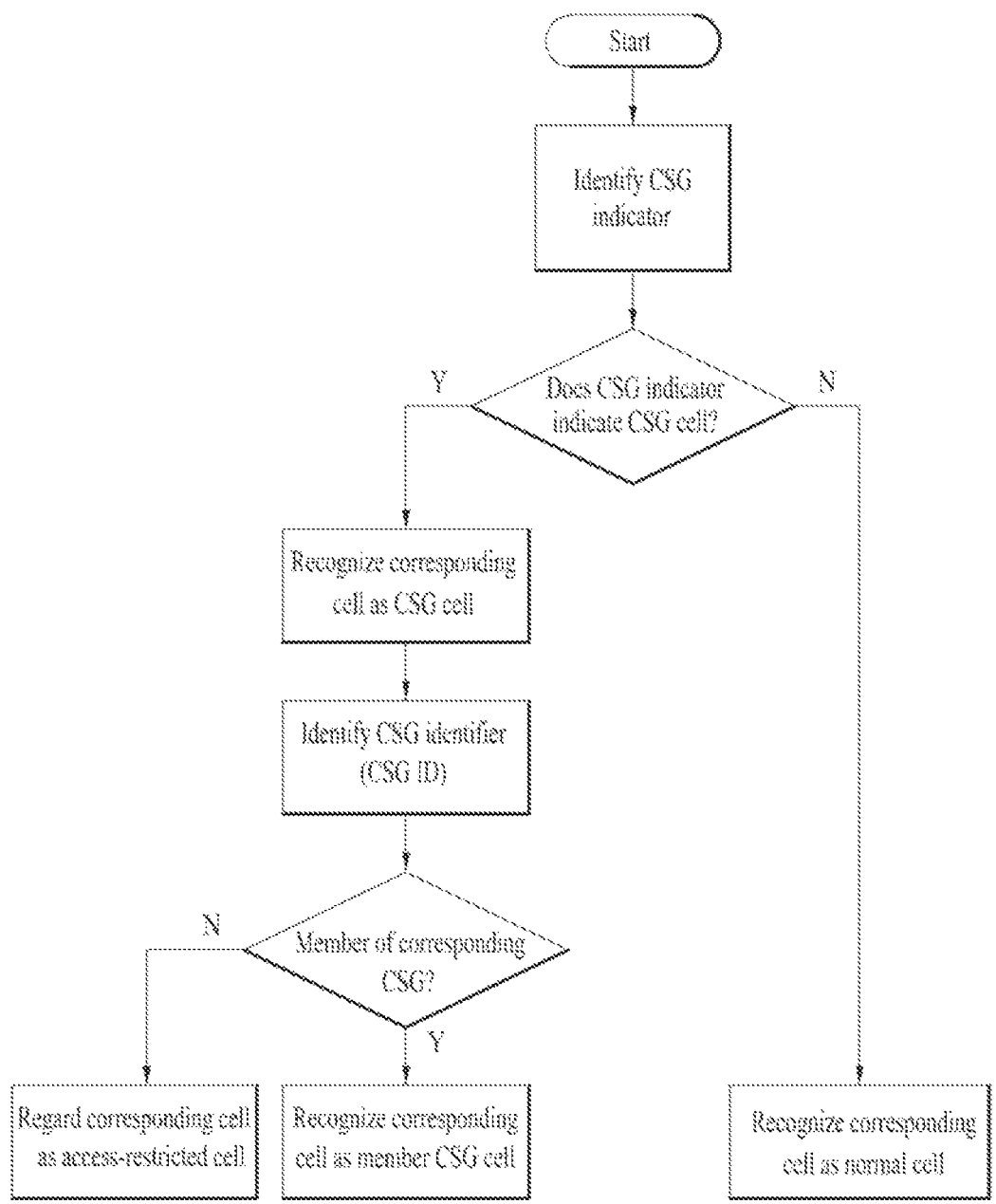
FIG. 6 is a flow chart illustrating that a user equipment of a wireless communication system identifies a type of a cell by using a CSG indicator.

FIG. 6 is a flow chart illustrating that a user equipment of a wireless communication system identifies a type of a cell by using a CSG indicator.

Referring to FIG. 6, the user equipment identifies a CSG indicator included in system information of a target cell to identify a cell type of the target cell, and recognizes the corresponding cell as a CSG cell if the CSG indicator indicates that the target cell is the CSG cell. Also, the user equipment identifies a CSG identifier included in the system information to identify whether the user equipment is a CSG member of the target cell.

Subsequently, if the user equipment identifies, through the CSG identifier, that it is the CSG member of the target cell, it recognizes the corresponding cell as the accessible CSG cell. If the user equipment identifies, through the CSG identifier, that it is not the CSG member of the target cell, it recognizes the corresponding cell as the non-accessible CSG cell.

In the mean time, if the CSG indicator indicates that the target cell is not the CSG cell, the user equipment recognizes the target cell as the normal cell. Also, if the CSG indicator is not transmitted, the user equipment recognizes the corresponding cell as the normal cell.

The CSG cell and a normal macro cell may be managed by some frequency. Hereinafter, this frequency will be defined as a mixed carrier frequency. The network may separately reserve specific physical layer cell identifiers for the CSG cell from the mixed carrier frequency. The CSG cell notifies the user equipment of information on physical cell identities (PCIs), which are reserved for the CSG at the current frequency, through the system information at the mixed carrier frequency. The user equipment that has received this information may determine whether a cell discovered at the corresponding frequency is the CSG cell or may not be the CSG cell, through the PCI of the cell. How to use this information will be described in respect of two types of user equipments.

If the user equipment does not support a CSG related function or does not have a list of CSGs to which the user equipment belongs as a member, it does not need to regard the CSG cell as a selectable cell during the cell selection and reselection procedures. In this case, the user equipment may identify the PCI only of the cell, and if the PCI is that reserved for the CSG, the user equipment may exclude the corresponding cell from the cell selection and reselection procedures. Generally, PCI of a cell may be identified directly during the step of allowing the physical layer of the user equipment to identify the presence of the corresponding cell.

In the meantime, if the user equipment has the list of CSGs to which the user equipment belongs as a member, to know a list of peripheral CSG cells at the mixed carrier frequency, it may identify that the corresponding cell is the CSG cell by discovering the cell having the PCI reserved for the CSG instead of identifying CSG identifiers of the system information of all the cells discovered within the range of all the PC's.

Next, a cell reselection procedure related to the CSG cell will be described. The CSG cell is that for supporting a better service to the corresponding CSG member user equipment. Accordingly, when the user equipment camps on the CSG cell, it may not be preferable to reselect the cell in view of service quality even though the user equipment discovers an inter-frequency cell having frequency priority higher than that of the serving cell.

In this respect, if a CSG cell of some frequency is determined as the best rank cell at the corresponding frequency in accordance with a cell reselection assessment criterion, the user equipment regards that the priority of the corresponding frequency is higher than the other frequency. In this way, when the user equipment designates a frequency priority higher than a frequency priority, which may be designated by the network for a specific frequency, this frequency priority is referred to as the implicit highest priority.

If the user equipment which camps on the CSG cell reselects the non-CSG cell of the corresponding frequency, it does not regard the corresponding frequency as the implicit highest priority and uses a frequency priority value transferred from the network during the cell reselection assessment.

Also, if the user equipment which camps on the CSG cell discovers another CSG cell corresponding to the best rank at the frequency having the same frequency priority, it may reselect the CSG cell or remain in the CSG cell where the user equipment currently camps on.

Next, an inbound mobility procedure for the CSG will be described. Unlike a normal mobility procedure, the inbound mobility procedure additionally includes identifying information of a target cell from system information of the target cell and reporting the identified information from the user equipment to the serving cell. The procedure of identifying information of a target cell from the system information of the target cell and reporting the identified information from the user equipment to the serving cell has two objects. One of the objects is to solve physical cell ID (PCI)/primary scrambling code (PSC) code contention, and the other one of the objects is for preliminary access check to allow the user equipment to identify whether the user equipment is the CSG cell member corresponding to a handover target and notify the network of the identified information. The PCI/PSC contention means that the network does not know a cell where the network performs handover for the user equipment in a state that one PCI/PSC is used by one or more HeNBs due to lack of PCI/PSC when the one or more HeNBs are provided. As a result, in order to solve the PCI/PSC contention problem and perform the preliminary access check, the user equipment should receive information, which may exactly identify the target cell from the system information of the target cell, before receiving a handover command, and should transmit the received information to the network. Also, the user equipment receives the CSG ID from the system information of the target cell through the preliminary access check and compares the received CSG ID with a list of CSGs to which the user equipment belongs as a member, for example, a CSG white-list. The user equipment identifies whether the user equipment is the CSG member of the target cell, through the above comparison, and reports the identified result to the network.

The user equipment transmits a proximity indicator to the network during the inbound mobility procedure. In this case, the proximity indicator is a message indicating that the user equipment has received a service from the CSG cell corresponding to the handover target by accessing the CSG. The user equipment includes a frequency of the target CSG cell in the proximity indicator. In a state that the target CSG cell exists at the frequency different from that of the serving cell of the user equipment, for example, in an inter-frequency inbound mobility state, the network performs measurement configuration for measurement of the corresponding CSG cell on the basis of the proximity indicator received from the user equipment. The user equipment may start a substantial measurement procedure for the corresponding CSG cell on the basis of the measurement configuration.

As a result, if the user equipment reports to the network that the measurement result is suitable for handover, the network commands the user equipment to read out system information of the corresponding CSG cell on the basis of the measurement report. The user equipment starts to read out the system information after receiving the system information reading command from the network. At this time, the user equipment receives CSG related information from the system information of the CSG cell and identifies whether it is a member of the corresponding CSG cell, on the basis of the received CSG related information. Also, the user equipment identifies a global cell identity (GCI) from the system information of the CSG cell. The user equipment transmits CSG ID of the CSG cell, information as to whether the user equipment is the CSG member of the CSG cell, and the GSI of the CSG cell to the network. The network determines whether to perform handover on the basis of the information of the CSG cell received from the user equipment. If the network determines to perform handover, it transmits a handover command to the corresponding CSG cell to the user equipment.

Even in the state that target CSG cell exists at the same frequency as that of the serving cell of the user equipment, for example, even in the intra-frequency inbound mobility state, the user equipment transmits the proximity indicator to the network. The network commands the user equipment to read out the system information on the basis of the proximity indicator. The user equipment may receive the system information reading command from the network only if it transmits the proximity indicator to the network. The user equipment starts to read out the system information after receiving the system information reading information from the network. The later procedure is the same as the aforementioned inter-frequency inbound mobility procedure.

Hereinafter, a search procedure for CSG cells will be described. The user equipment may enter service coverage of CSG cells randomly provided in a macro cell zone. A search method for CSG cells through a user equipment includes a manual search method and an autonomous search method.

First of all, the manual search method will be described. If the user equipment is in the service zone of the CSG cell first visited by the user equipment, the user of the user equipment commands the user equipment to perform manual search for the CSG cells. The user equipment receives system information of the CSG cells discovered by searching for available frequencies. The user equipment transfers names and/or information as to a member of the CSG cells received from the system information of the CSG cells to the user of the user equipment. If the user selects a proper CSG cell, the user equipment may receive a service from the selected CSG cell. Also, the user equipment records the position of the CSG cell where it first visits and from which it receives a service. And, the position information of the CSG cell is used to allow the user equipment to automatically search for the corresponding CSG cell when the user equipment again visits the position.

Next, the autonomous search method will be described.

Figure 7:
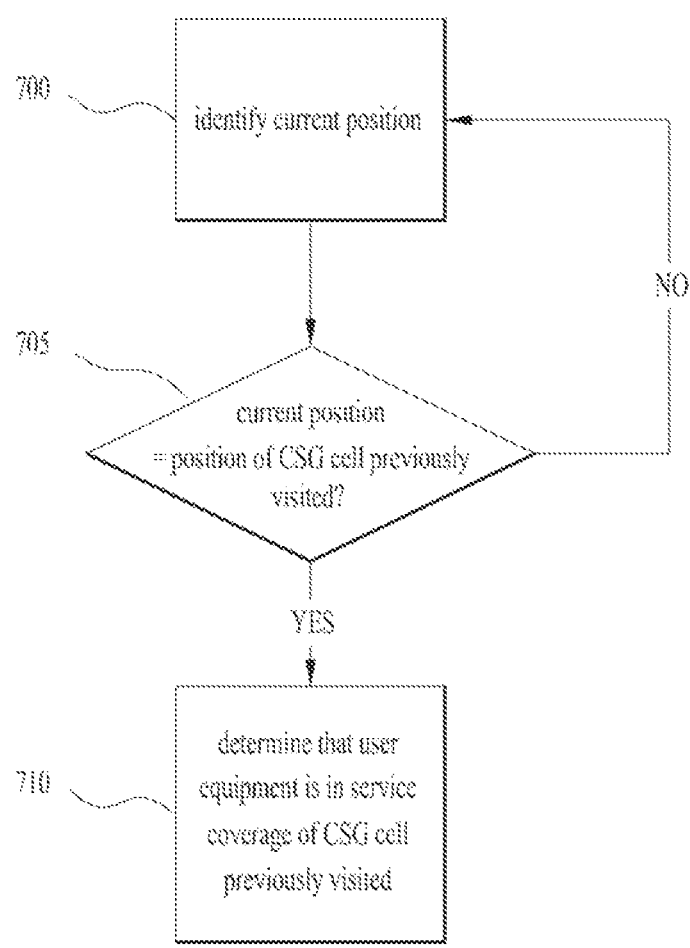
FIG. 7 is a diagram illustrating a general search procedure for CSG cells.

FIG. 7 is a diagram illustrating a general search procedure for CSG cells. First of all, the user equipment identifies its current position at step 700. The user equipment may use a positioning device such as a global navigation satellite system (GNSS) or a global positioning system (GPS) to determine the position information during the procedure of searching for the CSG cells. The user equipment may estimate the current position on the basis of measurement information on macro neighboring cells without the positioning device. For example, the user equipment may associate a position where specific macro neighboring cells having specific signal strength or more may be discovered at a specific frequency, with a specific position. Measurement information of macro neighboring cells for position estimation is referred to as a macro cell finger print. A position estimation method based on the macro cell finger print has a greater error in positioning exactness than that of a method based on a positioning device such as a GPS.

Next, the user equipment compares its current position with the position of the CSG cells where the user equipment has previously visited and from which the user equipment has received a service at step 705. If the current position is the same as the position of the CSG cells where the user equipment has previously visited and from which the user equipment has received a service or is within a certain error range, the user equipment determines that the accessible CSG cell has been detected, at step 710.

According to the related art, the base station may command the user equipment to receive and report system information of a neighboring cell to identify information on handover or the neighboring cell. In order that the user equipment receives the system information of the neighboring cell, it may take several tens of ms to several hundreds of ms or greater depending on a radio channel condition.

If quality of the neighboring cell is deteriorated for the time when the user equipment tries to receive the system information of the neighboring cell as a handover process such as handover to the CSG cell, handover to a neighboring cell having poor quality may not be preferable. Also, communication between the user equipment and the serving cell may be disconnected for the time when the user equipment tries to receive the system information of the neighboring cell. In this case, it may take a long time to read out the system information if quality of the neighboring cell is deteriorated, whereby service quality may be deteriorated seriously. This problem will be described with reference to the drawing.

Figure 8:
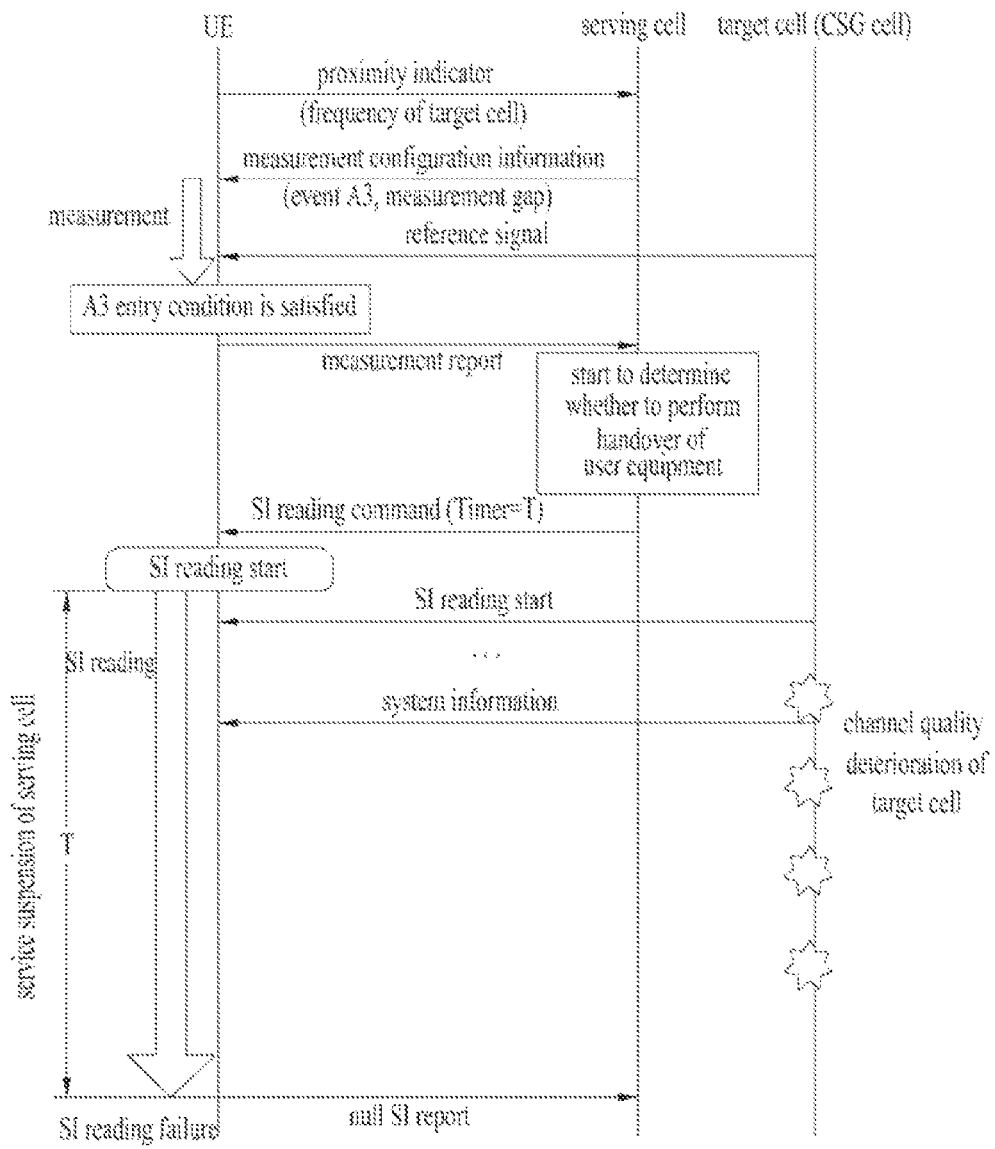
FIG. 8 is a signal flow chart illustrating a procedure of initiating a handover process through a user equipment by detecting a CSG cell as a handover target cell.

FIG. 8 is a signal flow chart illustrating a procedure of initiating a handover process through a user equipment by detecting a CSG cell as a handover target cell.

Referring to FIG. 8, as an entry condition of a measurement report event A3 is satisfied, after the user equipment transmits a measurement report message to the serving cell, it receives a command receiving and reporting system information of a target cell from the serving cell. Quality of the target cell may be deteriorated for the time when the user equipment is receiving the system information of the target cell. Although the user equipment continues to receive the system information of the neighboring cell for a timer T in spite of quality deterioration of the target cell, it may fail to successfully receive the system information due to quality deterioration of the target cell.

As a result, the user equipment fails to receive the system information due to quality deterioration of the target cell, whereby handover is not performed. Nonetheless, the user equipment tries to receive the system information for the timer T, and communication between the user equipment and the serving cell is disconnected for the timer T, whereby service quality of the user equipment is deteriorated.

According to the present invention, if the user equipment receives a command to receive the system information of the neighboring cell from the serving cell, it continues to receive the system information only if a measurement quality value of the corresponding neighboring cell is more than a threshold value. If the measurement quality value of the neighboring cell becomes less than the threshold value, the user equipment suspends reception of the system information and reports this status to the serving cell. This status will be described in more detail.

If the user equipment receives a command to report a message included in the system information of the neighboring cell from the network, that is, the serving cell, it starts to receive the system information of the neighboring cell. At the same time, the user equipment measures quality of the neighboring cell such as reference signal received power (RSRP) or reference signal received quality (RSRQ).

If the measurement quality value of the neighboring cell becomes less than a reference quality value, which is previously defined, before receiving desired system information from the neighboring cell, it suspends reception of the system information from the neighboring cell and reports the quality deterioration status of the neighboring cell to the serving cell together with the suspension of system information reception.

The reference quality value, which is used to suspend reception of the system information in the above procedure, may be a value previously designated for the user equipment by the network. For example, if the user equipment receives the command to receive and report the system information of the neighboring cell in response to reporting of the measurement result for handover, the reference quality value may be a leaving condition or entering condition of the measurement result report event A3 that has generated the measurement result reporting for handover. For reference, the leaving condition and the entering condition of the event A3 are disclosed in the 3GPP TS 36.331.

The reference quality value may be a value previously defined by the user equipment not the network, or may be a reference value used by the user equipment as a detection basis of the CSG cell during the autonomous search procedure for CSG cells.

A previously defined offset value may be applied to the reference quality value.

Also, it is preferable that the user equipment uses a temporally averaged quality value by filtering a value received by the RRC layer from the physical layer when evaluating quality of the neighboring cell.

In the mean time, the user equipment may transmit a system information reading suspension indicator to the serving cell to indicate reception suspension of the system information on the neighboring cell. Also, a method for transmitting a message format reporting a message of system information without actual system information may be considered. The user equipment may transmit reception suspension of the system information on the neighboring cell together with the quality measurement value of the neighboring cell.

If the serving cell receives the system information reading suspension indicator, the measurement result report without actual system information, or the measurement quality value of the neighboring cell instead of the system information of the neighboring cell from the user equipment, it determines that quality of the neighboring cell has been deteriorated.

It is preferable that the user equipment notifies the serving cell of reception suspension of the system information on the neighboring cell as soon as the measurement quality value of the neighboring cell becomes less than the reference quality value. Accordingly, even though a maximum time (for example, timer T321 of 3GPP TS 36.311), which may receive the system information on the neighboring cell, is given to the user equipment, the user equipment may suspend reception of the system information before the given maximum time expires. If the user equipment notifies the serving base station of reception suspension of the system information on the neighboring cell, it is preferable that the timer, which measures the maximum time for receiving the system information on the neighboring cell, is stopped.

In order that the user equipment receives the system information on the neighboring cell from the serving cell, if a certain time period (for example, measurement gap for measuring a neighboring cell) suspending communication between the user equipment and the serving cell is set to the user equipment, the user equipment resumes communication with the serving cell by autonomously canceling the above time period after reporting reception suspension of the system information on the neighboring cell to the serving cell.

Figure 9:
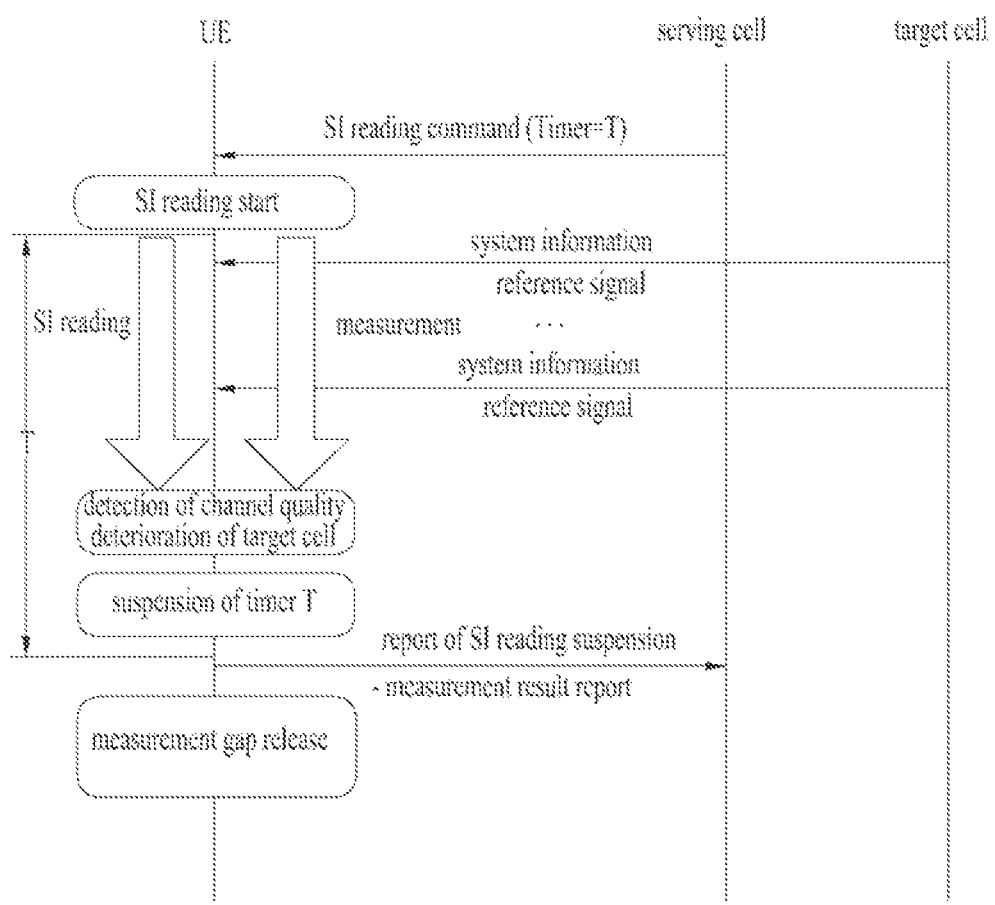
FIG. 9 is a signal flow chart illustrating a channel measurement procedure when system information is read out in accordance with one embodiment of the present invention.

FIG. 9 is a signal flow chart illustrating a channel measurement procedure when system information is read out in accordance with one embodiment of the present invention.

Referring to FIG. 9, the user equipment measures the quality value of the neighboring cell when receiving the system information on the neighboring cell. Accordingly, if the user equipment completes reception of the system information on the neighboring cell, it may also report the measurement quality value of the neighboring cell when reporting the system information to the serving cell. The serving cell may command the user equipment to perform a proper operation by referring to the quality value additionally reported together with the system information on the neighboring cell.

For example, it is assumed that the user equipment has discovered a CSG cell and reported the measurement result. In this case, if the serving cell commands the user equipment to receive and report system information on the CSG cell to determine handover to the CSG cell, the user equipment transmits the system information on the CSG cell together with the quality measurement value of the CSG cell in accordance with the present invention. Since the quality measurement value received secondarily by the serving cell is the latest measurement value, the serving cell may determine whether to command the user equipment to perform handover by referring to the latest measurement value as the more important value.

Figure 10:
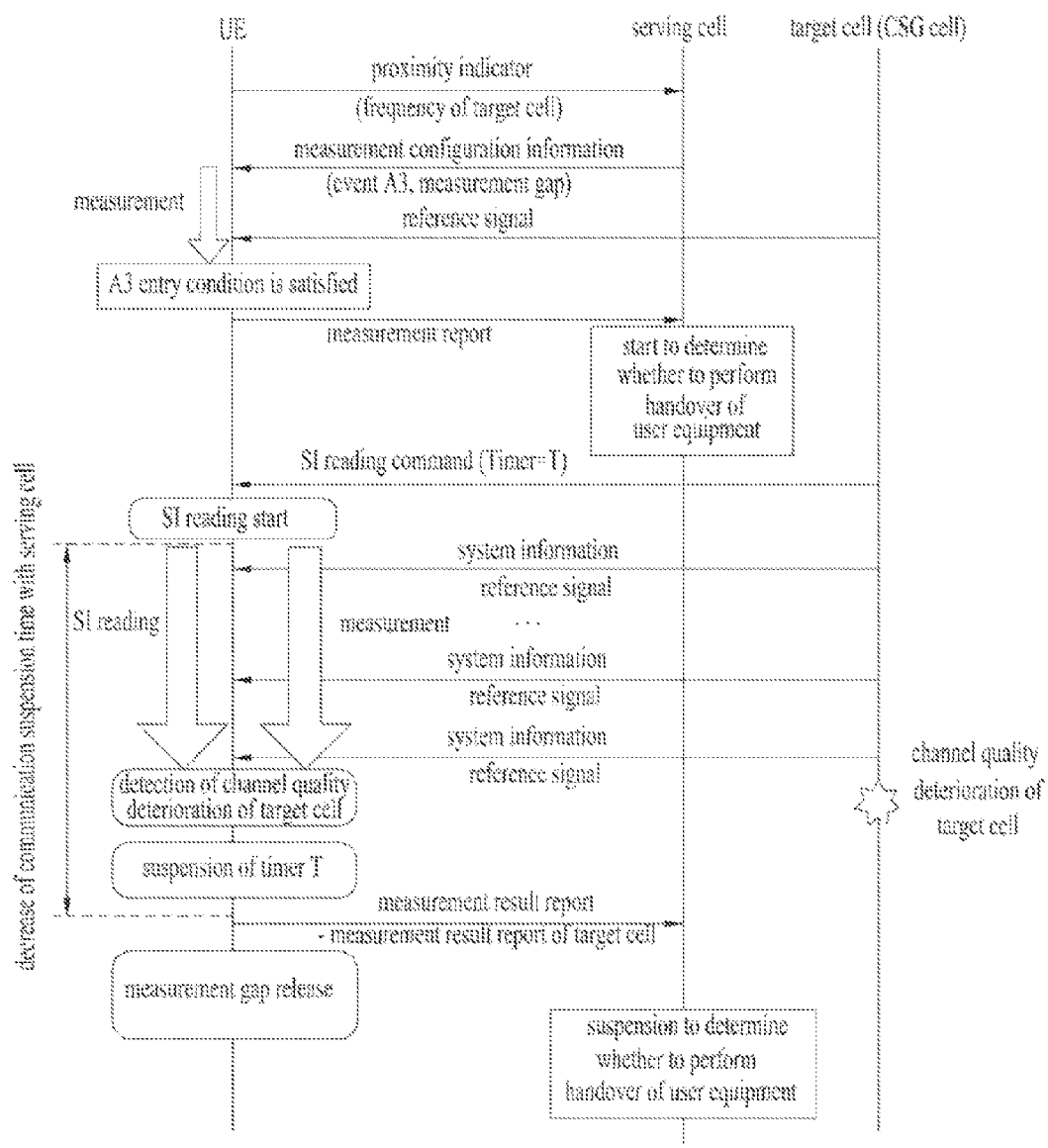
FIG. 10 is a signal flow chart illustrating a channel measurement procedure when system information is read out in accordance with another embodiment of the present invention.

FIG. 10 is a signal flow chart illustrating a channel measurement procedure when system information is read out in accordance with another embodiment of the present invention. In particular, FIG. 10 specifies that the present invention is applied to a handover process. Also, it is assumed that a target cell is a CSG cell in FIG. 10.

Referring to FIG. 10, after the measurement report event A3 is set to the user equipment, as the entry condition of the measurement report event A3 for the CSG cell which is the target cell is satisfied, the user equipment transmits measurement report to the serving cell. The serving cell that has received the measurement report for the target cell requests the user equipment to report the system information of the target cell to the user equipment. In accordance with the request, the user equipment starts to receive the system information on the neighboring cell and at the same time performs quality measurement for the corresponding cell.

If the quality measurement value of the neighboring cell satisfies the leaving condition of the measurement report event A3 before completing reception of the necessary system information from the neighboring cell, the user equipment suspends reception of the system information. In this case, it is preferable that the user equipment immediately reports reception suspension of the system information on the neighboring cell to the serving base station. More preferably, the user equipment may report the measurement quality value of the neighboring cell together with the reception suspension of the system information. Also, the user equipment releases establishment of the measurement gap received from the serving cell.

Figure 11:
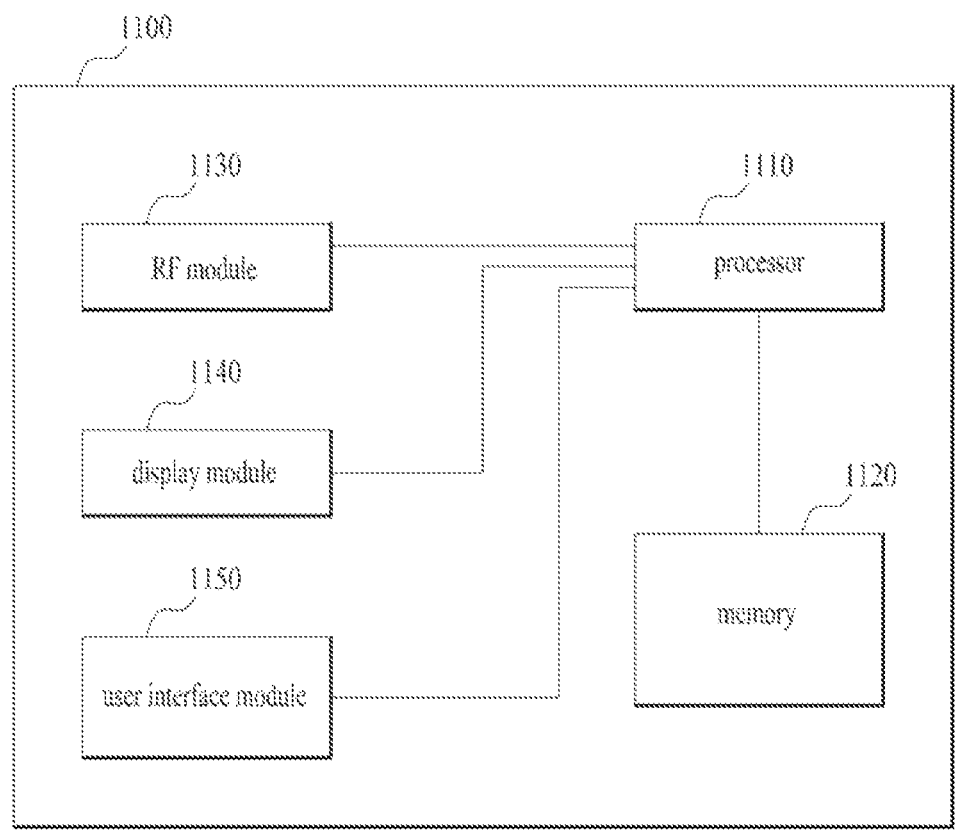
FIG. 11 is a block diagram illustrating a user equipment according to the embodiment of the present invention.

FIG. 11 is a block diagram illustrating a communication transceiver according to the embodiment of the present invention. The transceiver may be a part of the base station or the user equipment.

Referring to FIG. 11, the transceiver 1100 includes a processor 1110, a memory 1120, a radio frequency (RF) module 1130, a display module 1140, and a user interface module 1150.

The transceiver 1100 is illustrated for convenience of description, and some of its modules may be omitted. Also, the transceiver 1100 may further include necessary modules.

Moreover, some modules of the transceiver 1100 may be divided into segmented modules. The processor 1110 is configured to perform the operation according to the embodiment of the present invention illustrated with reference to the drawings.

In more detail, if the transceiver 1100 is a part of the base station, the processor 1110 may generate a control signal and map the control signal into a control channel configured within a plurality of frequency blocks. Also, if the transceiver 1100 is a part of the user equipment, the processor 1110 may identify the control channel indicated by the signal received from the plurality of frequency blocks and extract the control signal from the control channel.

Afterwards, the processor 1110 may perform the operation required based on the control signal. The detailed operation of the processor 1110 may be understood with reference to the description of FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method and apparatus for measuring a channel state when receiving system information on a neighboring cell in a wireless communication system have been described based on the 3GPP LTE system, they may be applied to various mobile communication systems in addition to the 3GPP LTE system.

The invention claimed is:

1. A method for receiving system information on a neighboring cell by user equipment (UE) in a wireless communication system, the method:
   receiving a system information reading command of a neighboring cell from a serving cell for a certain time period;
   suspending communication with the serving cell, and reading system information from the neighboring cell for the certain time period;
   measuring a channel status value during the certain time period, by using a reference signal received from the neighboring cell; and
   transmitting the system information to the serving cell after the certain time period elapses,
   when the channel status value is reduced to a preset value or less, suspending reading of the system information, and transmitting, by the UE, a system information reading suspension indicator to the serving cell, and
   wherein the system information reading suspension indicator indicates the quality of deterioration status of the neighboring cell, and
   wherein the preset value is set as a temporally averaged quality value by filtering a value received by a radio resource control (RRC) layer from a physical layer.

2. The method according to claim 1, further comprising resuming communication with the serving cell if the reading of the system information is suspended.

3. The method according to claim 1, wherein the system information reading suspension indicator is transmitted to the serving cell together with the channel status value.

4. A user equipment (UE) in a wireless communication system, the user equipment comprising:
- a wireless communication module for transmitting and receiving a signal to and from a serving cell and a neighboring cell; and
- a processor for processing the signal,
- wherein the processor, if a system information reading command of the neighboring cell is received from the serving cell for a certain time period, suspends communication with the serving cell, reads system information from the neighboring cell for the certain time period, measures a channel status value during the certain time period by using a reference signal received from the neighboring cell, and transmits the system information to the serving cell, and
- when the channel status value is reduced to a preset value or less, the processor suspends reading of the system information, and transmits a system information reading suspension indicator to the serving cell, and
- wherein the system information reading suspension indicator indicates the quality deterioration status of the neighboring cell, and
- wherein the preset value is set as a temporally averaged quality value by filtering a value received by a radio resource control (RRC) layer from a physical layer.

5. The user equipment according to claim 4, wherein the processor resumes communication with the serving cell if the reading of the system information is suspended.

6. The user equipment according to claim 4, wherein the system information reading suspension indicator is transmitted to the serving cell together with the channel status value.

* * * * *